(12) United States Patent
Keene

(10) Patent No.: US 7,175,218 B1
(45) Date of Patent: Feb. 13, 2007

(54) TRUCK BED EXTENDER AND CARGO GATE

(76) Inventor: Gregory M. Keene, 8721 E. Amherst Dr., #D, Denver, CO (US) 80231

( * ) Notice: Subject to any disclaimer, the term of this patent is extended or adjusted under 35 U.S.C. 154(b) by 36 days.

(21) Appl. No.: 10/917,948

(22) Filed: Aug. 13, 2004

(51) Int. Cl.
*B60P 7/08* (2006.01)

(52) U.S. Cl. .................................. 296/26.08; 296/57.1

(58) Field of Classification Search ............. 296/26.01, 296/57.1, 26.08, 26.11; 410/129, 151; 224/402, 224/403; 49/246
See application file for complete search history.

(56) References Cited

U.S. PATENT DOCUMENTS

| | | | |
|---|---|---|---|
| 4,472,639 A | 9/1984 | Bianchi | |
| 4,531,773 A | 7/1985 | Smith | |
| D291,789 S | 9/1987 | Noga | |
| 5,658,033 A | 8/1997 | Delaune | |
| 5,788,311 A * | 8/1998 | Tibbals | 296/62 |
| 6,113,173 A | 9/2000 | Leitner et al. | |
| 6,120,076 A | 9/2000 | Adsit et al. | |
| 6,155,622 A | 12/2000 | Reed | |
| 6,340,190 B1 | 1/2002 | Rosebrugh et al. | |
| 6,378,926 B1 | 4/2002 | Renze et al. | |
| 6,402,215 B1 | 6/2002 | Leitner et al. | |
| 6,425,618 B1 | 7/2002 | Garland et al. | |
| 6,601,899 B2 | 8/2003 | Kiester et al. | |
| 6,626,624 B1 * | 9/2003 | Kopperud | 410/129 |
| 6,994,389 B1 * | 2/2006 | Graffy et al. | 296/26.11 |

* cited by examiner

*Primary Examiner*—Stephen Gordon
(74) *Attorney, Agent, or Firm*—Ramon L. Pizarro; Edwin H. Crabtree

(57) ABSTRACT

A truck bed partitioning and extension device for use on a bed of a pickup truck is disclosed. The truck bed partitioning and extension device includes a transverse panel having a pair of ends and a pair of side panels. At least one of the side panels is attached to the ends of the transverse panel through a double hinge. The double hinge allows folding along a pair of generally parallel axes that allow the pivoting of the side panel along a first axis that allows the side panel to pivot to a position next to the transverse panel and pivoting of the side panel about a second axis that positions the side panel at a distance from the transverse panel.

14 Claims, 4 Drawing Sheets

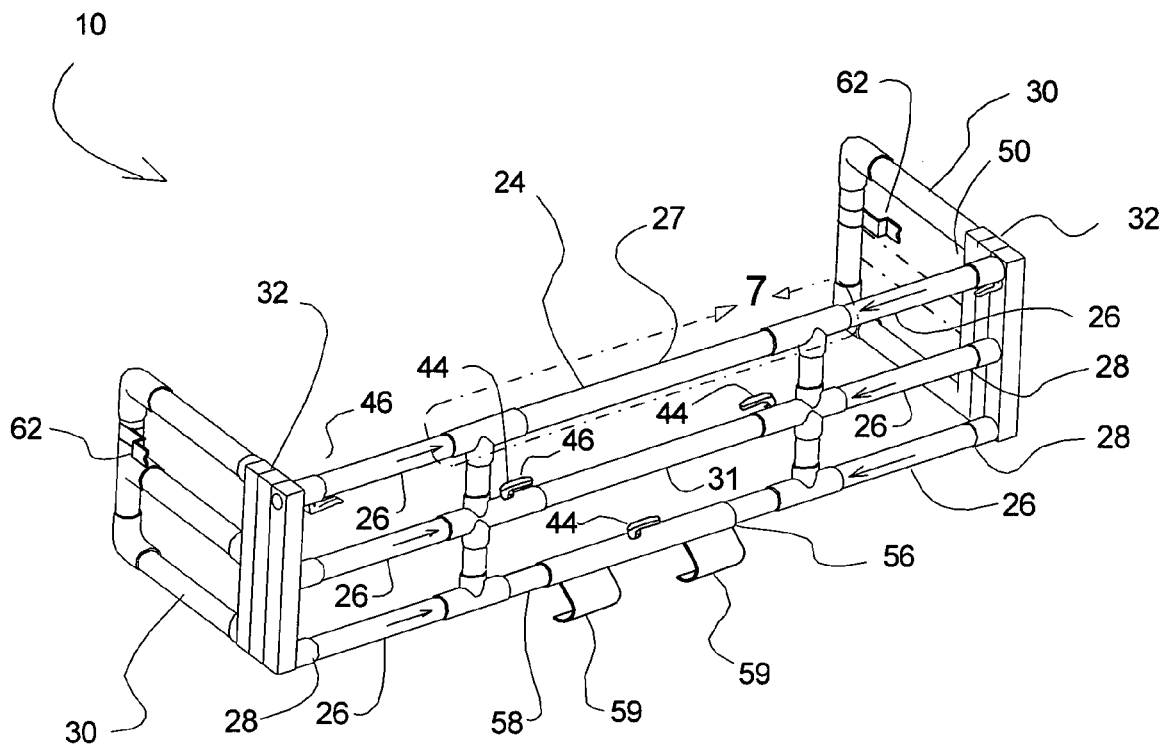
Fig. 3
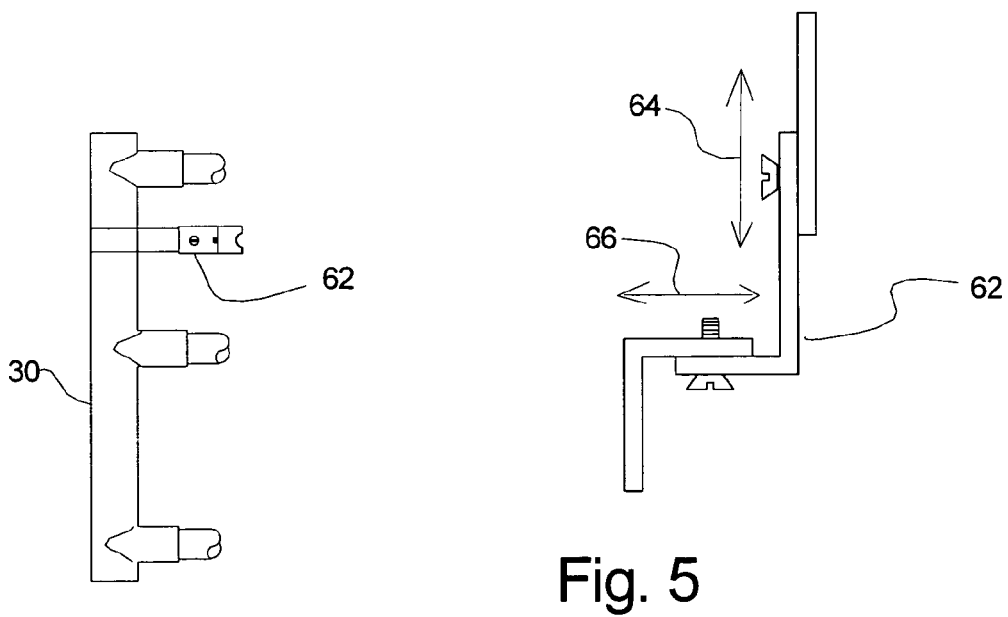
Fig. 4
Fig. 5

TRUCK BED EXTENDER AND CARGO GATE

BACKGROUND OF THE INVENTION (a) Field of the Invention

This invention generally relates to a cargo bed extension device and truck bed divider. More particularly, but not by way of limitation, to an extension that cooperates with the tailgate of a pickup truck to allow use of the tailgate area of the truck and which may also be used to partition the bed of the truck. The device is also collapsible so that it may accommodate various sizes of truck beds and will also allow storage within the cab of the truck to prevent theft.

(b) Discussion of Known Art

Pickup trucks have become very popular in large part due to the versatility that is offered by the provision of a bed that can be used to carry a wide variety of items. The versatility and usefulness of the bed of the pickup truck can be enhanced through the use of dividers, which separate the bed of the truck into areas that will not allow items within those areas to migrate out of those areas. Additionally, bed extenders, such as the device known in U.S. Pat. No. 6,402,215, or U.S. Pat. No. 4,472,639 to Bianchi, both of which are incorporated herein by reference in its entirety, have also enhanced the versatility of the pickup truck in that they allow the use of the tailgate as useful cargo area.

Important problems associated with known devices are that dividers can typically only be used as dividers and not as bed extenders as well. Furthermore, divider systems typically rely on the use of railings and other framing systems that are used to position the dividers along the bed. The problem of using these rails or framing systems is that they become obstacles for other uses, such as the loading and unloading of items such as tables with legs that can catch on these systems. Accordingly, they enhance the truck's usefulness for some aspects, but limit the usefulness in other areas.

Similarly, bed extenders that flip from one position, where they act as bed extenders or tailgates, to another position where they act as a divider suffer from the versatility needed to allow the user to take full advantage of the versatility of the truck's bed. Still further, these devices suffer from the problem of undesired lifting of the device due to the pivoting connection used to attach the device to the bed. The lifting or temporary flipping up of the device occurs when the pickup is driven over a bump that causes the device to be tossed up, allowing items being held in the truck to migrate out of the bed. One solution to this problem is shown in U.S. Pat. No. 6,402,215 to Leitner et al. (Leitner) The Leitner solution is to simply attach a strap from the bed extender to the latch mechanism of the tailgate of the truck. This approach has severe limitations in that it requires the strap to hang on to a very small protrusion of the latch mechanism. Attachment to this small protrusion is highly unreliable in that it may accidentally release from normal driving vibrations.

Still another disadvantage of devices such as the Leitner device is that they require the modification of the vehicle through the attachment of fasteners or other means that permanently alter the vehicle. The disadvantage of this approach is that it can affect the vehicle resale value for buyers who do not want the modification.

Still further, known devices suffer from the limitation that they are not easily taken down for storage in a safe place. This makes these devices vulnerable to theft. To complicate matters further, these devices do not provide secure means for locking the devices, so the user must rig something together to prevent theft of the device.

Therefore, a review of known devices reveals that there remains a need for a device or system that can be used as both a divider and a bed extender.

Still further, there remains a need for a device that can accommodate a large variety of truck bed geometries, and perform equally as well in the various sizes of truck beds.

There remains a need for a truck bed extender and partitioning device that can be easily taken down and stored in the cab of the truck.

There remains a need for a truck bed extender and partitioning device that can be securely held against the tailgate of the truck so as to prevent the loss of cargo.

There remains a need for a device that can function as a truck bed extension or divider, and that is easily collapsed to accommodate different truck bed widths or to allow further collapse for easy storage of the device when not in use.

SUMMARY

It has been discovered that the problems left unanswered by known art can be solved by providing a truck bed partitioning and extension device for use on a bed of a pickup truck, the truck bed partitioning and extension device including:

a transverse panel having a pair of ends; and a pair of side panels, at least one of the side panels being attached to the ends of the transverse panel through a double hinge, the double hinge allowing folding along a pair of generally parallel axes that allow the pivoting of the side panel along a first axis that allows the side panel to pivot to a position next to the transverse panel and pivoting of the side panel about a second axis that positions the side panel at a distance from the transverse panel.

It is contemplated that the side panels may attach to the locking or latching mechanism used to close the tailgate of the truck. Examples of attachments that are useful to connect the side panels to the locking or latching mechanisms can be found in U.S. Pat. Nos. 6,155,622, and 6,402,215 both of which are incorporated herein by reference in their entirety.

Still further, the disclosed invention provides a tailgate clamp that grips the tailgate, holding the invention against the tailgate and thus preventing the undesired loss of cargo.

According to an example of the disclosed invention the transverse panel includes removable or extendable sections that allow the device to fit various widths of pickup beds.

Still further, the disclosed invention provides for the use of a double hinge that allows the full collapse of the device in order to facilitate the use of the device as a divider. Additionally, a clamping foot has been incorporated into the transverse member in order to allow the transverse member to be firmly clamped against the sidewall of the bed of the truck.

It will be understood that the disclosed invention can be collapsed for easy storage, and held in the collapsed position by the same clamp that is used to hold the disclosed invention against the tailgate of a truck.

It will be understood that the disclosed invention allows the truck bed partitioning and extension device to be attached along various locations of the truck bed without needing to use mechanical fasteners or to modify the bed of the truck.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 3 is a perspective view of an example of the invention.

FIG. 4 Illustrates the use of a side support bracket that allows the use of the device along the inside the bed of the truck.

FIG. 5 is a top plan view of the bracket illustrated in FIG. 4.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
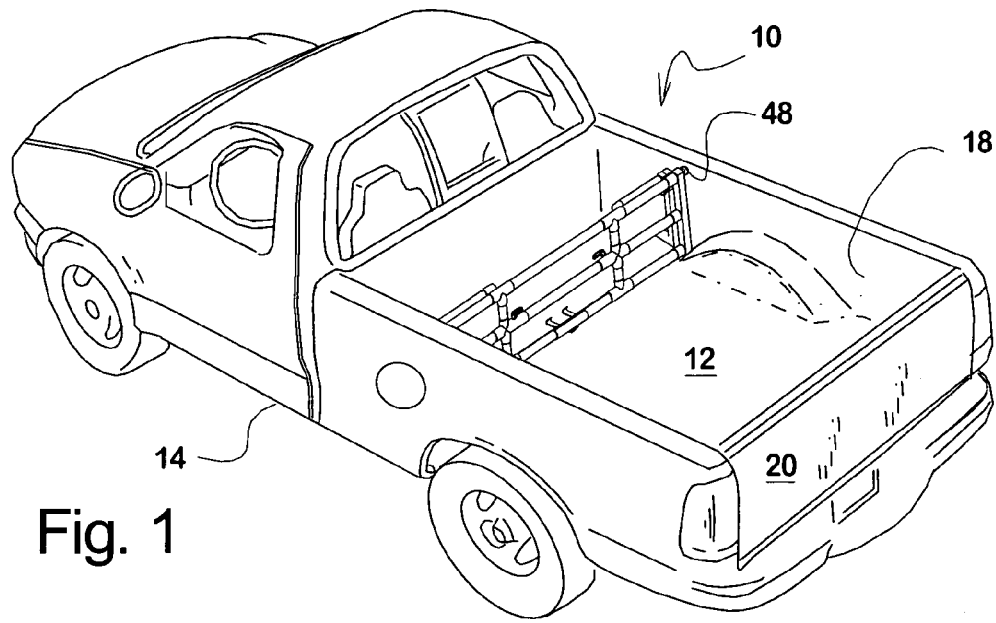
FIG. 1 is a perspective view of an embodiment of the invention while in use as a bed divider in the bed of a pickup truck.

Turning now to FIG. 1 where and example of a truck bed partitioning and extension device 10 for use on a bed 12 of a pickup truck 14 according to the disclosed invention has been illustrated. As illustrated, the bed 12 of the pickup truck 14 includes a floor 16 and a pair of sidewalls 18 that extend upwards from the floor 16. Additionally, a tailgate 20 has been mounted between the sidewalls 18 at a location at the end 22 of the bed 12 of the truck 14.

It will be understood that the disclosed partitioning and extension device 10 has been designed to accommodate various sizes of truck beds. Additionally, the disclosed invention may be used to carry out various functions, such as acting as bed divider or portioning device that prevents items placed in the bed from migrating from one end to the other end of the bed. Additionally, the disclosed configuration will permit easy removal and storage of the device. Importantly, the disclosed invention will include an extendable transverse panel and a double hinge arrangement that will allow the device to be collapsed and folded into a tight package that may be easily carried within the cab of the pickup truck, and thus prevent theft of the device.

Figure 7:
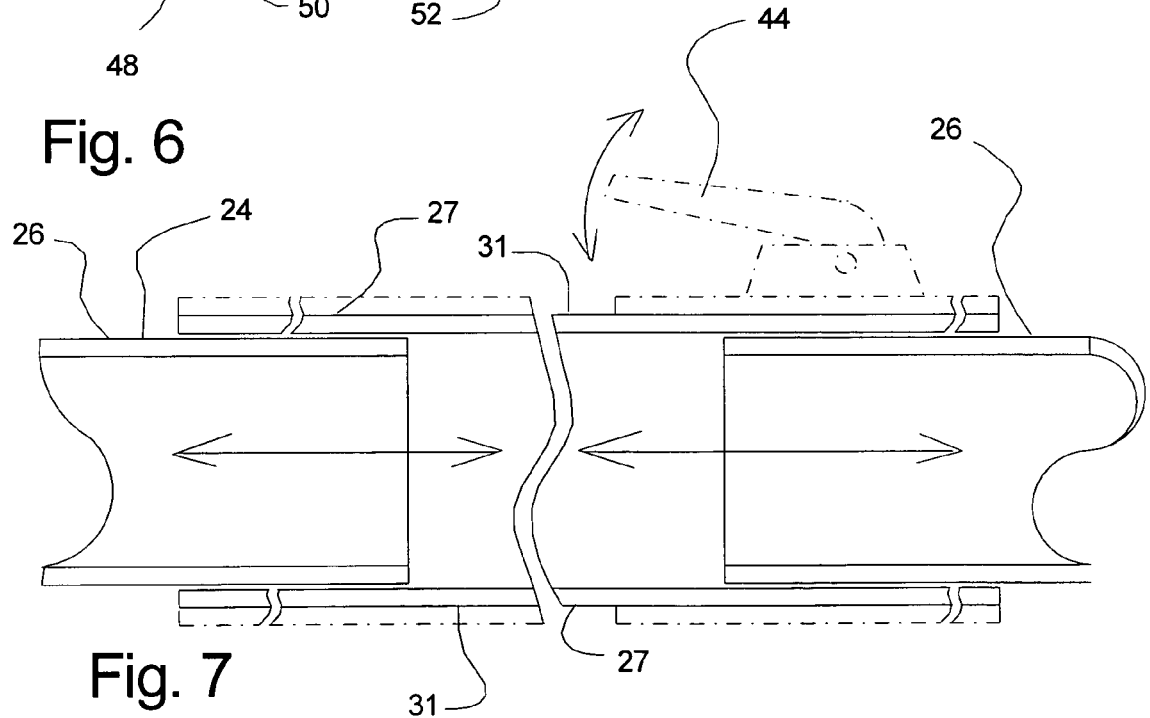
FIG. 7 illustrates the telescoping sections of the transverse panel.

Turning to FIGS. 1–3 and 7 it will be understood that the partitioning and extension device 10 will include a transverse panel 24, which is preferably extendable though the use of telescoping sections 26. To achieve this telescoping function, the mid-portion 27 of the transverse panel 24 is made of tubing 31 that can accept the telescoping sections 26 that are slid into the mid-portion 27. FIG. 7 illustrates how the telescoping sections 26 slide into and out of the tubes 31 that make up the transverse panel 24. This telescoping action allows the disclosed invention to accommodate different widths of truck beds, and allows the collapse of the device for storage.

The relationship of the telescoping sections 26 relative to one another is fixed along the ends 28 of the transverse panel 24. Accordingly, all of the telescoping sections will move in parallel to one another into and out of the mid-portion 27. Therefore, by fixing the position of one of the telescoping sections 26 relative to the mid-portion 27 will fix the position of the remaining connected telescoping sections 26.

Figure 2:
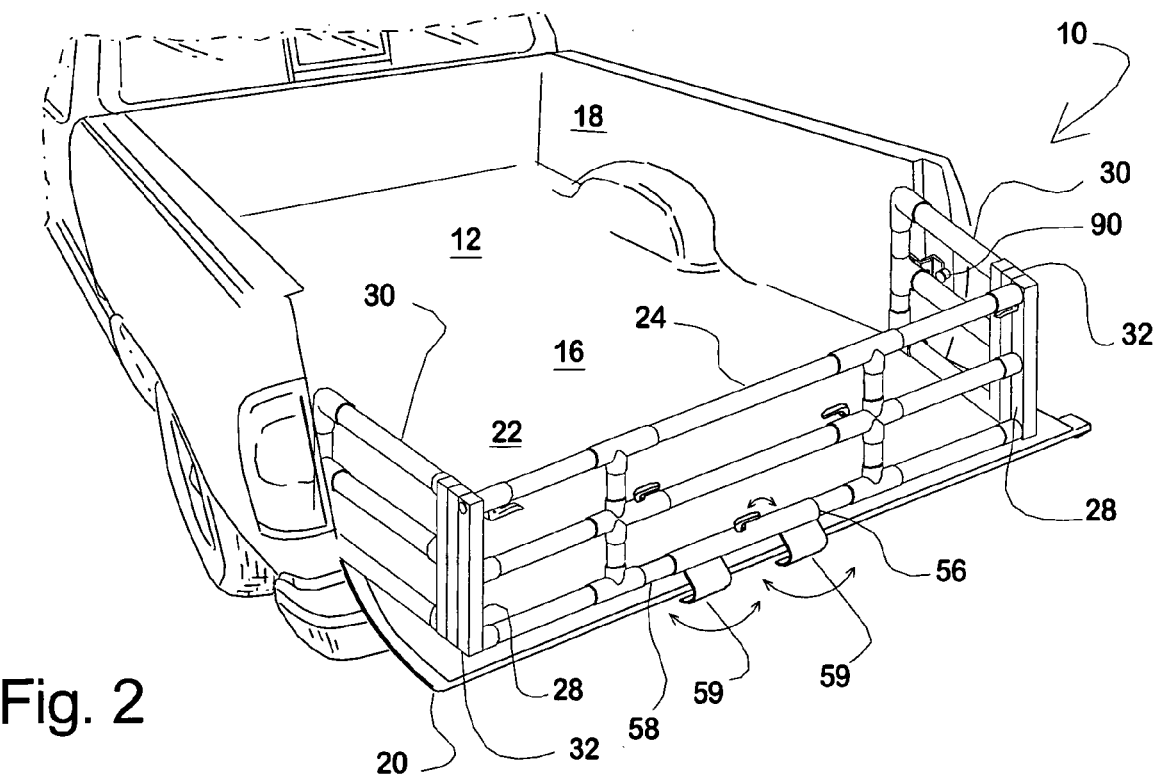
FIG. 2 illustrates the use of the disclosed invention as a bed extender, and shows the cooperation of the device with the bed of the truck.
Figure 6:
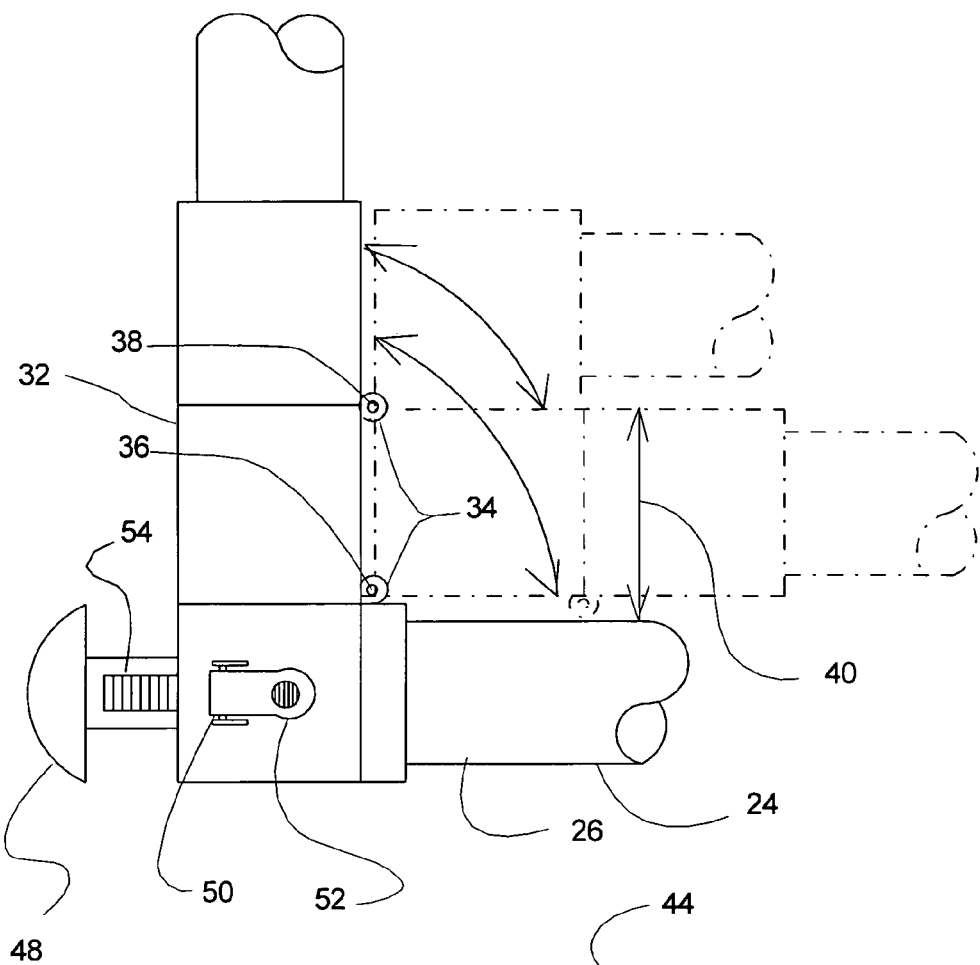
FIG. 6 illustrates the use of a double hinge and the folding of side panels afforded by the double hinge when used with the invention.

As illustrated in FIGS. 1–3, a pair of side panels 30 will be attached to the ends 28 of the transverse panel 24 through a double hinge 32. As illustrated in FIG. 6, the double hinge 32 allows the folding of the side panels 30 along a pair of generally parallel axes 34. Thus the double hinge 32 will allow the pivoting of the side panels 30 along a first axis 36 that allows the side panels 30 to pivot to a position next to the transverse panel 24. While pivoting of the side panels 30 about a second axis 38 will position the side panel 30 at a distance 40 from the transverse panel 24.

It will be understood that the ability to fold the side panels along at least two different axes will facilitate the collapse and storage of the disclosed invention. Specifically, by allowing one of the side panels 30 to lie at a distance 40 to the transverse panel 24 and the other side panel 30 next to the transverse panel 24 will result in a compact stack of the transverse panel 24 and the two side panels 30 neatly positioned in a generally parallel fashion over the transverse panel 24. This stacking is particularly important in allowing the stowing of the device in its most compact form.

As illustrated in FIG. 3, it is contemplated that the transverse panel 24 will be made extendable through the use of telescoping sections 26 that are positioned between the ends 28 of the transverse panel 24. In the illustrated example the telescoping sections 26 will be positioned along the transverse panel 24 through the use of clamps 44, which may be a simple cam based locking device that locks the section 26 by pressure from a cam that is pushed against the section 26 through the pressing down of a lever 46. It is important to note that the use of a cam based lock is simply one example of how to achieve locking. It is contemplated that many systems, such as threaded compression fittings, pins, or other devices may be used to lock the sections 26 in place.

It is contemplated that the extension of the transverse panel 24 will allow the device to be used in beds of different widths. Also, the extension of the transverse panel 24 will facilitate the use of the disclosed invention as a divider or portioning device. To use the partitioning and extension device 10 as a partitioning device the user simply folds the side panels if desired, positions the partitioning and extension device 10 at the desired location along the bed 12, and then uses an extendable clamping foot 48 to firmly engage the sidewalls 18 of the bed 12. As illustrated in FIG. 6, the clamping foot 48 extends from the transverse panel 24 towards the sidewalls 18 of the bed 12 of the truck 14.

It will also be understood from FIG. 6 that the position of the clamping foot 48 relative to the transverse panel 24 will be adjusted through the use of releasable clamps 50, which may be the same types of clamps 44 use in the fastening of the telescoping sections 26, or other types of locking devices such as those that can apply a compressive force to the clamping foot 48 or provide another mechanism to keep it in place, such as threads or pawls for example. However, the illustrated example shows the use of a cam-based clamp that uses a spring loaded lever 52 to drive a pawl into a ratcheting rack 54. This arrangement will allow the transverse panel 24 to be firmly clamped against the bed 12 of the truck 14 by simply extending the clamping foot 48 to compress the transverse panel 24 between the sidewalls 18 of the bed 12.

Turning now to FIGS. 2 and 3 it will be understood that it is contemplated that the truck bed partitioning and extension device 10 may also include a tailgate clamp 56. The tailgate clamp 56 will allow the transverse panel 24 to engage the tailgate 20 in order to retain the transverse panel 24 against the tailgate 20. It is contemplated that the tailgate clamp 56 will be attached to a lower edge 58 of the transverse panel 24, so that this lower edge 58 may be held firmly against the tailgate 20. It is important to hold the transverse panel 24 against the tailgate 20 so that the transverse panel 24 will not lift from the tailgate 20 when the partitioning and extension device 10 is being used as a bed extender. If the tailgate clamp 56 is not used, the transverse panel 24 may lift from the tailgate 20 when the vehicle passes over a bump, for example. The temporary unwanted lifting of the transverse panel would allow cargo items to fall out of the bed 12 of the truck 14.

Figure 8:
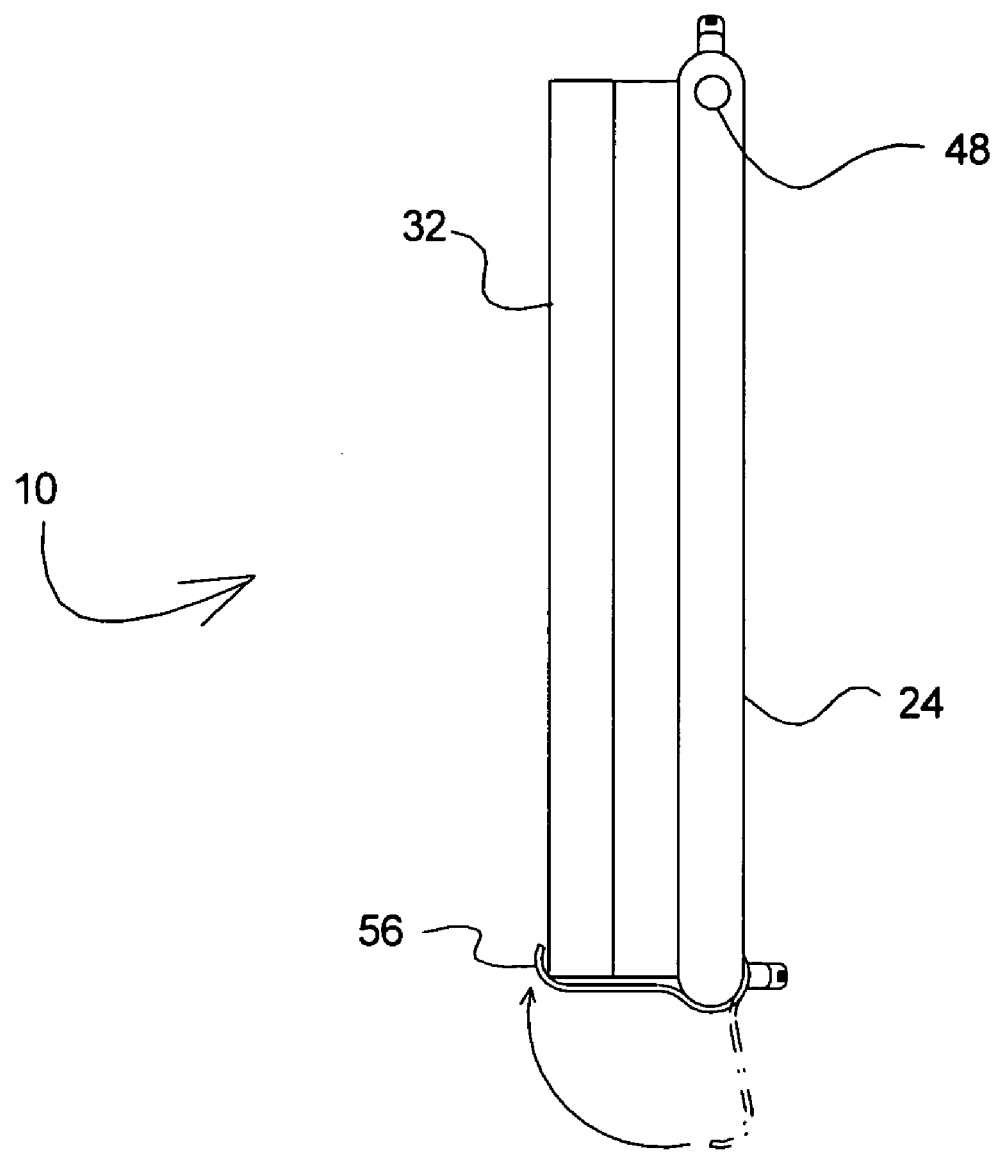
FIG. 8 is an end view looking at the disclosed invention while the side panels are folded over against the transverse panel and the concave section of the clamp is used to hold the side panels against the transverse panel.

As illustrated in FIGS. 2 and 3, it is contemplated that the tailgate clamp 56 will include a concave section 59 that is moveable from a first position, illustrated in FIG. 3, where the tailgate clamp is away from the tailgate 20 to a second position, illustrated in FIG. 2, where the concave section 59 is pressed under and against the tailgate, clamping the lower edge 58 of the transverse panel 24 against the tailgate 20. Additionally, FIG. 8 shows that the clamp 56 may also be used to hold the disclosed invention in its collapsed position that allows storage of the device in small spaces, such as behind the truck's seat.

Turning to FIGS. 4 and 5 it will be understood that it is further contemplated that the truck bed partitioning and extension device 10 may also include least one side panel bed attachment bracket 62 that will allow the side panels 30 to be fastened against the locking hardware 90 of the bed 12 of the truck 14. Once the bracket 62 of truck bed partitioning and extension device 10 has been attached to the locking hardware, then the clamp 56 may be used to clamp the truck bed partitioning and extension device 10 against the tailgate 20, exerting a tension load between the locking hardware 90 and the tailgate 20 through the concave portion 59 of the clamp 56. FIG. 5 illustrates that the side panel bed attachment bracket 62 allows forward and aft length adjustments, indicated by arrow 64, as well as inboard and outboard extension adjustments, indicated by arrow 66. The attaching of the side panels 30 against the locking hardware 90 will thus provide a robust, easily adjustable attachment of the truck bed partitioning and extension device 10.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A truck bed partitioning and extension device for use on a bed of a pickup truck, the bed of the pickup truck having a floor, a pair of sidewalls extending upwards from the floor, and an opening adapted for accepting a tailgate between the sidewalls, and locking hardware adapted for locking the tailgate aagainst the sidewalls, the truck bed partitioning and extension device comprising:

a transverse panel having a pair of ends;
a pair of side panels, at least one of the side panels being attached to the ends of the transverse panel through a double hinge, the double hinge allowing folding along a first axis and a second axis, the first axis and second axis being generally parallel to one another and allow the pivoting of the respective side panel along the first axis, so that the side panel to pivots to a position next to the transverse panel, and pivoting of the respective side panel about the second axis positions the side panel at a distance from the transverse panel; and
an extendable clamping foot, the clamping foot extending from the transverse panel towards the sidewalls of the bed of the truck, so that the transverse panel is clamped against the bed of the truck by the extension of the clamping foot, compressing the transverse panel between the sidewalls of the bed of the truck.

2. A truck bed partitioning and extension device according to claim 1 wherein both side panels are attached to the transverse panel through a double hinge.

3. A truck bed partitioning and extension device according to claim 1 and further comprising a tailgate clamp, the tailgate clamp being attached to the transverse panel and being adapted for retaining the transverse panel against a tailgate in the opening between the sidewalls.

4. A truck bed partitioning and extension device according to claim 1 and further comprising at least one side panel bed attachment bracket, the side panel bed attachment bracket being adapted for allowing the attachment of one of the side panels against a locking hardware of the bed of the truck.

5. A truck bed partitioning and extension device for use on a bed of a pickup truck, the bed of the pickup truck having a floor, a pair of sidewalls extending upwards from the floor, a tailgate mounted between the sidewalls, and locking hardware mounted from the sidewalls for locking the tailgate against the sidewalls, the truck bed partitioning and extension device comprising:

an extendable transverse panel having a pair of ends;
a pair of side panels, each of the side panels being attached to the ends of the transverse panel through a double hinge, the double hinge allowing folding along a first axis and a second axis, the first axis and second axis being generally parallel to one another and allow the pivoting of the respective side panel along the first axis to allow the side panel to pivot to a position next to the transverse panel, and pivoting of the respective side panel about the second axis that positions the side panel at a distance from the transverse panel, so that the side panels may be folded over the extendable transverse panel in a generally parallel manner relative to the extendable transverse panel by allowing one of the side panels to lie at the distance to the transverse panel and the other side panel next to the transverse panel and between the transverse panel and the panel that is at a distance to the transverse panel; and an extendable clamping foot, the clamping foot extending from the transverse panel towards the sidewalls of the bed of the truck, so that the transverse panel is clamped against the bed of the truck by the extension of the clamping foot, compressing the transverse panel between the sidewalls of the bed of the truck.

6. A truck bed partitioning and extension device according to claim 5 wherein the extendable transverse panel is extendable trough telescoping sections positioned between the ends of the transverse panel.

7. A truck bed partitioning and extension device according to claim 5 and further comprising a tailgate clamp, the tailgate clamp being attached to the extendable transverse panel and being adapted for retaining the transverse panel against a tailgate in an opening between the sidewalls.

8. A truck bed partitioning and extension device according to claim 7 and said extendable transverse panel further comprising a lower edge, and said tailgate clamp is a concave section that is moveable from a first position wherein the lower edge of the extendable transverse panel is free from the tailgate to a second position where the tailgate in the opening between the sidewalls is clamped between the concave section and the lower edge of the extendable transverse panel.

9. A truck bed partitioning and extension device according to claim 5 and further comprising at least one side panel bed attachment bracket, the side panel bed attachment bracket allowing the attachment of one of the side panels against the locking hardware of the bed of the truck.

10. A method for providing a universal truck bed partitioning and extension device for use on a bed of a pickup truck, the bed of the pickup truck having a floor, a pair of sidewalls extending upwards from the floor, and a tailgate mounted between the sidewalls, the tailgate being adapted for being supported from the sidewalls by locking hardware mounted from the sidewalls, the method comprising:
   providing an extendable transverse panel having a pair of ends; and
   providing a pair of side panels;
   attaching each of the side panels to the ends of the transverse panel through a double hinge, the double hinge allowing folding along a first axis and a second axis, the first axis and second axis being generally parallel to one another and allow the pivoting of the respective side panel along the first axis to allow the side panel to pivot to a position next to the transverse panel, and pivoting of the respective side panel about the second axis positions the side panel at a distance from the transverse panel, so that the side panels may be folded over the extendable transverse panel in a generally parallel manner relative to the extendable transverse panel by allowing one of the side panels to lie at a distance to the transverse panel and the other side panel next to the transverse panel and between the transverse panel and the panel that is at a distance to the transverse panel; and
   an extendable clamping foot, the clamping foot extending from the transverse panel towards the sidewalls of the bed of the truck, so that the transverse panel is clamped against the bed of the truck by the extension of the clamping foot, compressing the transverse panel between the sidewalls of the bed of the truck.

11. A method according to claim 10 wherein the extendable transverse panel is extendable trough telescoping sections positioned between the ends of the transverse panel.

12. A method according to claim 10 and further comprising a tailgate clamp, the tailgate clamp being attached to the extendable transverse panel and being adapted for retaining the transverse panel against the tailgate.

13. A method according to claim 12 and said extendable transverse panel further comprising a lower edge, and said tailgate clamp is a concave section that is moveable from a first position wherein the lower edge of the extendable transverse panel is free from the tailgate to a second position where the tailgate is clamped between the concave section and the lower edge of the extendable transverse panel.

14. A method according to claim 10 and further comprising at least one side panel bed attachment bracket, the side panel bed attachment bracket allowing the attachment of one of the side panels against the locking hardware of the bed of the truck.

* * * * *